P. MIHAN.
Sewer-Gas Trap.

No. 222,795.  Patented Dec. 23, 1879.

Witnesses
S. N. Piper
W. W. Land

Inventor.
Patrick Mihan.
by attorney.
R. H. Eddy

UNITED STATES PATENT OFFICE.

PATRICK MIHAN, OF CAMBRIDGEPORT, MASSACHUSETTS.

IMPROVEMENT IN SEWER-GAS TRAPS.

Specification forming part of Letters Patent No. 222,795, dated December 23, 1879; application filed May 17, 1879.

*To all whom it may concern:*

Be it known that I, PATRICK MIHAN, of Cambridgeport, in the county of Middlesex and State of Massachusetts, have invented a new and useful Improvement in Sewer-Gas Traps; and I do hereby declare the same to be described in the following specification, and represented in the accompanying drawings, of which—

Figure 1:
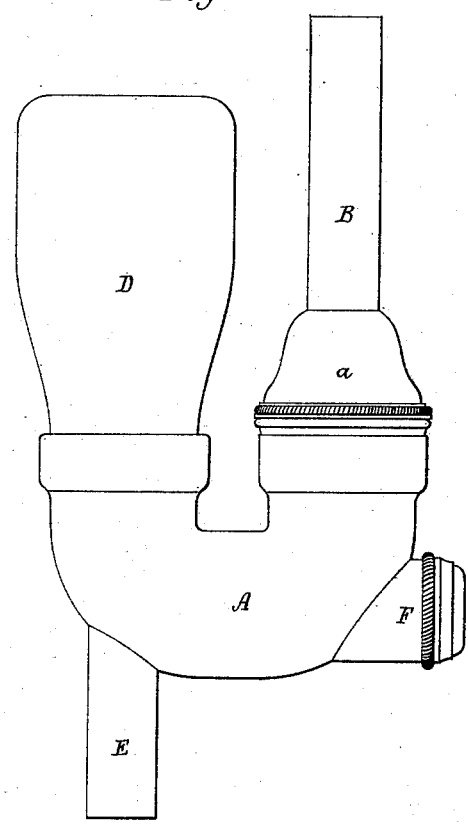
Figure 2:
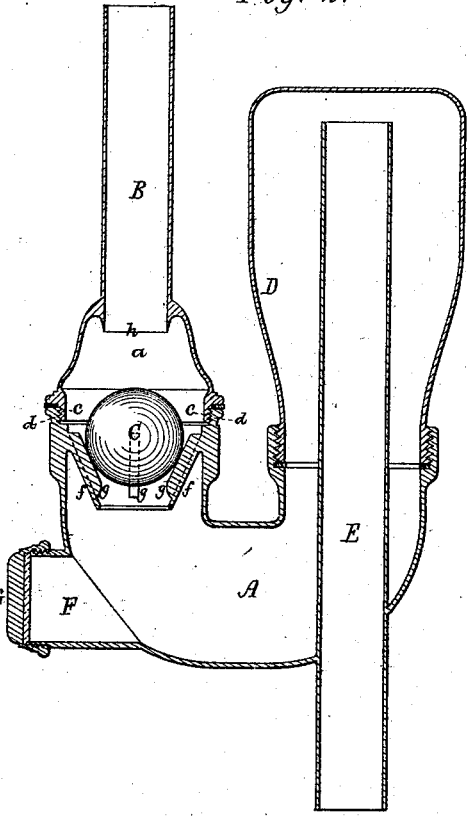

Figure 1 is a side elevation, and Fig. 2 a vertical and longitudinal section, of a trap containing my present invention, which relates to the sewer-gas trap for which Letters Patent No. 214,424, and dated April 15, 1879, have been granted to me.

The sewer-gas trap so patented consists not only of a conduit or chambered base, and an induct or pipe leading up therefrom, and having a ball-valve and a conical extension or seat therefor, but of an intercepting-receiver and its educt.

I have improved the said trap by constructing it with a removable cup or valve-seat fixed to the induct and screwed into the top of the chambered base. I have also provided such base with means of supporting the ball-valve or preventing it from dropping too far into the base; and I have also provided the trap with a sediment-discharge or clearing-educt and a screw-cap thereto. I have also constructed the valve-seat acute-angular in transverse section, like a knife-edge, though such forms no part of my invention.

In the drawings, A denotes the chambered base, and B the induct, whose lower part is a bell-shaped frustum, *a*, which, in this instance, is provided at its top with the knife-edge valve-seat *h*, and at its mouth with a male screw, *c*, to screw into a female screw, *d*, formed in the inner surface of the mouth of the base A, in manner as shown. Within the said base, and extending down from its said mouth, is a hollow conic frustum, *f*, furnished on its inner surface with a series of ribs, *g*, upon which the ball-valve C, when at its lowest position, rests, such ribs enabling the water, when the valve is down, to freely flow around it.

By having the valve-seat *h* fixed to the induct and screwed into the mouth of the chambered base, and the valve provided with supports, as described, I am enabled to get at the valve to advantage, when such may be required, whether for its removal for the substitution of another, or for cleansing it, the knife-edge or knife-edge valve-seat causing such a close fit of the valve to it as to thoroughly prevent any passage of gas between the two.

The intercepting-chamber is shown at D and its educt at E. The chambered base, for the easier flowage of water through it, I prefer to make in the curved form, as represented, and I provide it with a clearing-educt or tubular extension, F, to open out of it, as shown, such extension being furnished with a cap or cover, G, to screw upon it at its outer end, in manner as represented. By means of the said extension the interior of the base may be readily reached for clearing it of any deposits that may require to be removed therefrom.

The apparatus or sewer-gas trap is to be used as described in the specification of the aforesaid Patent No. 214,424. The frustum *f* is to contract the descending column of water after it may have fallen on and become spread outwardly by the ball-valve, such contraction of it causing it to have an increased scouring effect in the base.

What I claim as my present invention is as follows, viz:

1. The combination of the ball-valve sustaining-ribs with the sewer-gas trap, composed of the induct, ball-valve, valve-seat, chambered base, intercepting-reservoir and its educt, all being arranged substantially as set forth.

2. The combination of the ball-valve sustaining-ribs and their supporting-frustum with the sewer-gas trap, composed of the induct, ball-valve, valve-seat, chambered base, intercepting-reservoir and its educt, all being substantially as shown and described.

PATRICK MIHAN.

Witnesses:
R. H. EDDY,
W. W LUNT.